(12) United States Patent
Chernick et al.

(10) Patent No.: US 6,718,399 B1
(45) Date of Patent: *Apr. 6, 2004

(54) COMMUNICATIONS ON A NETWORK

(75) Inventors: Aubrey Chernick, Los Angeles, CA (US); Sam Greenblatt, Agoura Hills, CA (US)

(73) Assignee: Candle Distributed Solutions, Inc., Santa Monica, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1031 days.

(21) Appl. No.: 08/660,730

(22) Filed: Jun. 10, 1996

Related U.S. Application Data

(63) Continuation of application No. 08/432,372, filed on May 1, 1995, which is a continuation of application No. 08/065,926, filed on May 21, 1993, now abandoned.

(51) Int. Cl.$^7$ ................................................. G06F 9/46
(52) U.S. Cl. ............................................................ 709/330
(58) Field of Search .................................. 395/682, 684, 395/683, 672; 709/304, 302, 303, 102, 330, 328, 315, 310

(56) References Cited

U.S. PATENT DOCUMENTS

| | | | |
|---|---|---|---|
| 4,423,414 A | | 12/1983 | Bryant et al. ............... 340/825 |
| 4,630,196 A | * | 12/1986 | Bednar, Jr. et al. .......... 364/200 |
| 4,800,488 A | | 1/1989 | Agrawal et al. ............. 364/200 |
| 4,949,248 A | | 8/1990 | Caro .......................... 364/200 |
| 5,005,122 A | | 4/1991 | Griffin et al. ................ 364/200 |
| 5,036,459 A | * | 7/1991 | den Haan et al. ............ 364/200 |
| 5,133,053 A | * | 7/1992 | Johnson et al. ......... 395/DIG. 1 |
| 5,165,018 A | * | 11/1992 | Simor ......................... 395/300 |
| 5,187,787 A | | 2/1993 | Skeen et al. ................. 395/600 |
| 5,212,778 A | * | 5/1993 | Dally et al. .................. 395/400 |
| 5,212,792 A | * | 5/1993 | Gerety et al. ................ 395/650 |
| 5,265,250 A | * | 11/1993 | Andrade et al. ............. 395/650 |
| 5,267,235 A | | 11/1993 | Thacker ........................ 370/60 |
| 5,301,280 A | * | 4/1994 | Schwartz et al. ............ 395/325 |
| 5,307,490 A | | 4/1994 | Davidson et al. ............ 395/650 |
| 5,321,808 A | * | 6/1994 | Rupp .......................... 395/164 |
| 5,327,559 A | * | 7/1994 | Priven et al. ................ 395/700 |
| 5,329,619 A | * | 7/1994 | Page et al. ................... 395/200 |
| 5,335,347 A | * | 8/1994 | Foss et al. ................... 395/650 |
| 5,341,477 A | | 8/1994 | Pitkin et al. ................. 395/200 |
| 5,341,499 A | * | 8/1994 | Doragh ....................... 395/700 |

OTHER PUBLICATIONS

A. Silberschatz, P. Galvin, Operating System Concepts, Addison–Wesley Pub. Comp., pp. 659–676, 1994.*

J. F. Barrera III, "A Fast Match Network IPC Implementation", Proceedings of the Usenix Mach Symposium, Nov. 1991.*

M. Condict, et al, "Optimizing Performance of Mach–Based Systems by Server Co–Location: A Detailed Design", OSF Research Institute, Aug. 24, 1993.*

L. E. Heindel, et al, "Highly Reliable Synchronous and Asynchronous Remote Procedure Calls", IEEE, pp. 103–107, May 1996.*

*Primary Examiner*—Sue Lao
(74) *Attorney, Agent, or Firm*—Gates & Cooper LLP

(57) ABSTRACT

An Object Procedure Messaging, or OPM, facility in the form of an internal and external Remote Procedure Call, or RPC, facility uses client and server stubs to transfer messages on both local and remote platforms to reduce multiple calls when a local server object is not available when first called by a local client object. A local memory queue is used to store the message calls for local objects so that the client and server stubs shield the client and server objects from the details of communications therebetween for both local and remote message calls.

13 Claims, 1 Drawing Sheet

U.S. PATENT DOCUMENTS 5,355,453 A  * 10/1994  Row et al. ............. 395/DIG. 1
5,398,336 A  *  3/1995  Tantry et al. ................ 395/600
5,421,015 A      5/1995  Khoyi et al. ................. 395/650
5,682,534 A  * 10/1997  Kapoor et al. ............... 395/684
5,848,234 A  * 12/1998  Chernick et al. ...... 395/200.33
5,887,172 A  *  3/1999  Vasudevan et al. .......... 395/684

* cited by examiner

COMMUNICATIONS ON A NETWORK

This is a File Wrapper Continuation of application Ser. No. 08/432,372, filed May 1, 1995, which is a Continuation application of Ser. No. 08/065,926, filed May 21, 1993, now abandoned.

BACKGROUND OF THE INVENTION

1. Field of the Invention

This invention relates to techniques for dealing with calls between objects or entities in computer software and systems.

2. Description of the Prior Art

Object oriented computer software and systems utilize entities, called objects, for providing enhanced abilities to design, develop, implement and operate software and other computer related systems. One conventional object related system is known as the object linking and embedding, or OLE, system. Object related systems use various strategies for exchanging data with and between objects. One conventional approach to handling the interchange of data with objects is known as the System Object Model, or SOM, used in the OS/2 operating system.

Another conventional approach for the interchange of data with objects is known as the dynamic data exchange, or DDE, system format used in Windows in the DOS operating system. The DDE system was originally developed for use with non-object oriented systems and modified by means of the SOM for use with object oriented systems through message passing utilizing a system table.

In conventional object oriented systems, the interchange of data with objects is accomplished with a two phase data exchange procedure. In such conventional two phase data exchange procedures, the first phase or stage includes the communication request from the calling or client object which must be acknowledged by the called or server object. Successful completion of the first stage results in the receipt by the client object of the acknowledgement of the communication request by the server object. Thereafter, the second stage of the server becomes available.

Remote procedure call, or RPC, techniques are known and used for many operations between platforms but often have overhead requirements within a platform which degrade system efficiency and can result, under certain conditions, in loss of accuracy. What are needed are techniques for data interchange with both local and remote objects which do not result in the reduction of data transfer accuracy nor the increased processing overhead in conventional data interchange systems.

SUMMARY OF THE INVENTION

In accordance with the present invention, inter-object communications are handled through an internal remote procedure call which provides an enhanced mode for local platform object oriented environments. In particular, inter-object communications between a client and a server object on the same platform are handled via an internal queuing arrangement using local platform memory, eliminating the need for the client object to wait for an acknowledgement by the server object. That is, the remote procedure call operates in a two phase data exchange mode that is transparently superseded when the server object is determined to be on the same platform as the client object. The message calls are placed in a local queue with an object identifier or handle when the client object first requests acknowledgement from the server object of a message call from the client to the server. No further action by, or delay of, the client object is then required. No overhead is wasted by repetitive requests for the same data exchange if the server object is not currently available. No unwanted multiple data exchanges result and therefore data exchange is maintained at 100% accuracy. The present invention thereby avoids the reduction in system performance inherent with known data interchange techniques which may result, for example, from multiple requests for data transfer acknowledgements.

In another aspect, the present invention provides a method of communicating between client and server entities on computer platforms interconnected by a transport network by determining if a server is located on the same local platform as a client wishing to communicate a message to the server, transferring the message to the server via the transport network if the client and server are not located on the same local platform, storing the message in a local memory queue on the local platform if the client and server are located on the local platform, causing the server to interrogate the local queue when the server is available, and then transferring the message to the server from the local memory queue.

These and other features and advantages of this invention will become further apparent from the detailed description that follows which is accompanied by drawing figures. In the figures and description, reference numerals indicate various features of the invention, like numerals referring to like features throughout both the drawing figures and the description.

DETAILED DESCRIPTION OF THE PREFERRED EMBODIMENT(S)

Figures 1, 2:
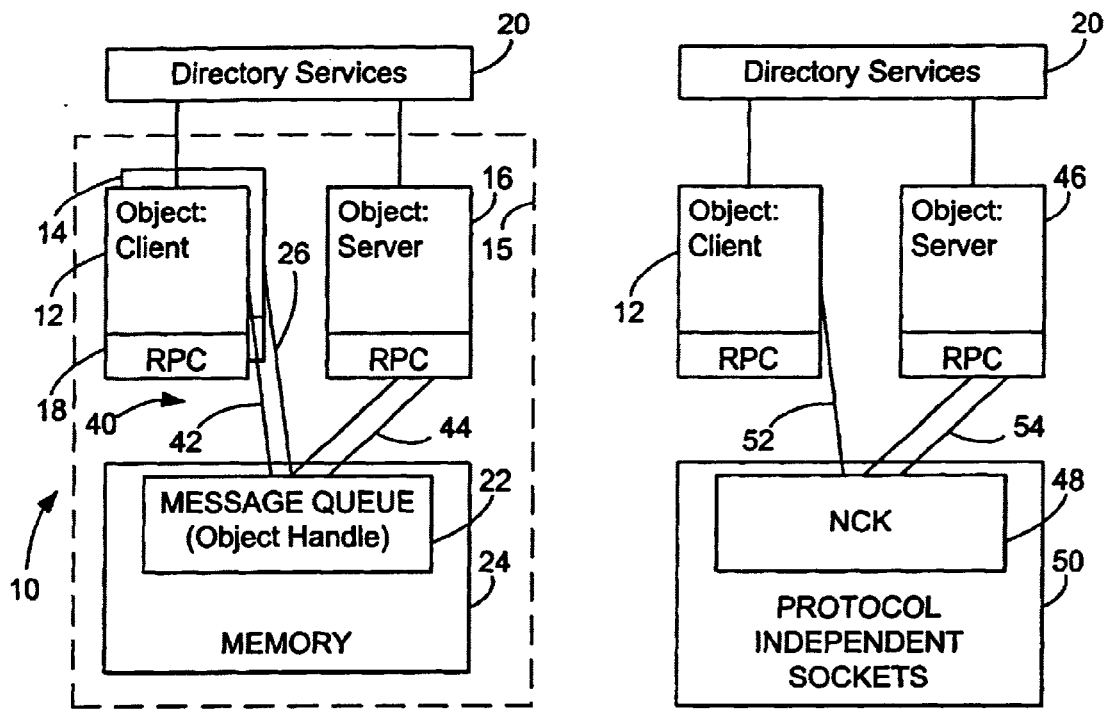
FIG. 1 is a simplified flow diagram of the inter-object data path in an internal RPC implementation in accordance with the present invention.
FIG. 2 is a simplified flow diagram of the inter-object data flow path in an external RPC implementation of the present invention.

In accordance with the present invention, inter system object communications are achieved through an internal remote procedure call, or internal RPC, which also provides for a local platform object oriented environment. The internal RPC manages data issues including operational semantics and communications, and provides a convenient and consistent mechanism for specifying the interaction between objects within a local platform.

In accordance with the present invention, the internal RPC is part of an internal/external RPC system referred to herein as an Object Procedure Messaging, or OPM, facility which may be used to transfer data to objects whether included on the same platform or on other platforms interlinked by means of heterogeneous as well as non-heterogeneous network paths.

The OPM of the present invention provides operational semantics, and ensures that a data transfer request or other message to an object is executed only once if the client and server objects are on the same local platform. A message that is sent to or waiting on a busy server object is queued in the OPM facility. There is no need to resend a message to a busy object in a local platform. This reduces or eliminates the possibility of data inaccuracy resulting from the reprocessing of the same message by the inadvertent processing of both the original as well as the resent message.

In other words, the present invention does not require a message to be sent to a server object more than once, even if that server object is busy when the message is sent by the client object. The first version of the message is therefore the only one that can be processed, substantially enhancing data integrity.

The OPM facility provides a set of object services that are made available to all objects. These services include common naming and/or directory facilities so that, for example, messages for a busy object may be held in a queue and conveniently identified or retrieved by the destination object.

The OPM facility is compliant with the Object Management Architecture, or OMA, of the Object Management Group. The name service creates an object name space that accesses names and data from existing directory services.

RPC facilities according to the present invention utilize client and server object stubs to shield the client and server objects from the details of communication between the objects. The client or calling object which originates the message call, and the server or called object which is to receive the call, are programmed as if they were intended to be linked together. A description of the server interface, that is, the names of the procedures and the types of arguments the server implements, is processed, yielding a client stub and a server stub.

The client stub is linked with the client. To the client, the client stub looks like the server. The server stub is linked with the server. To the server, the server stub looks like the client. The client stub allows the client to operate as if it has received acknowledgement of the message call from an available server, whether or not the server is then actually available. The server stub operates to permit the server to retrieve the message call when the server does in fact become available.

Building applications using the internal and external RPC, or OPM, facility of the present invention includes three phases: the compile time, bind time, and call time interceptor phases. The compile time phase involves the development of the client and server stubs. These stubs are complied by a stub generator that processes an explicit definition of the interface, written in an interface description language (NIDL). The bind time phase involves the object making its availability known by registering itself and, when appropriate, associating itself with a particular language.

The call time phase involves the local transport protocol, control protocol, and data representation. The transport protocol is used by the stubs to convey arguments and results reliably between objects. The control protocol consists of information included by the OPM facility in each transport packet to track the state of the message. The data representation is a convention for ensuring data compatibility between objects.

The OPM facility is therefore an extension of a conventional, external only RPC facility, expressed through a procedural abstraction of the call time components (transport, control, and data representation). OPM is an effective way to provide basic communication with a diverse set of objects by emulating the native conventional RPC facilities of these systems for data exchange between objects on the same platform. One of the major aspects of the OPM is the defining of the interfaces between objects that make this emulation of the native RPC facilities, and the use of local protocols, conveniently achievable.

Referring now to FIG. 1, a simplified flow diagram of internal or local platform inter-object data path 10 according to one embodiment of the present invention, is presented for several objects as an illustrative example in which client objects 12 and 14 need to transfer a message with server object server 16. Client objects 12 and 14 and object 16 are all on the same local platform, shown as local platform 15. Using client object 12 as an example, each object is provided with an appropriate connection to a portion of the RPC interface layer, such as RPC interface 18 of client object 12. Each such object is also provided with a communication path to directory services 20 as well as message queue 22 which may conveniently be maintained within local platform memory 24 on local platform 15.

Server available data path 26 between client object 14 and server object 16 on local platform 15 will be described first as an illustration of the message and data flow path between objects on the same platform when the server object is available to accept and acknowledge the client object message call when made by the client object.

Figure 3:
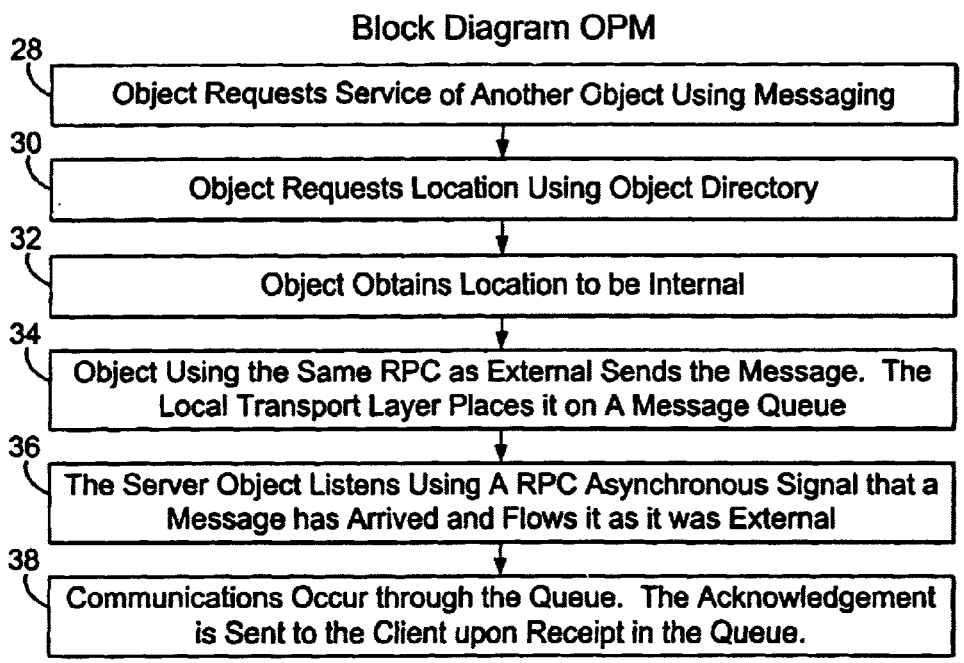
FIG. 3 is a simplified flow chart of an OPM implementation according to the present invention.

Referring also to FIG. 3, in which a simplified flow chart of an OPM implementation according to the present invention is presented, the first step of server available data path 26 is step 28 in which client object 14 requests service from another object, such as server object 16, using an object related messaging facility. Conventional messaging facilities for individual objects may be used to request service from other objects. The details of the particular messaging facility used are dependent upon the local platform and language and may be conveniently determined by a person of ordinary skill in this art by reference to the appropriate available descriptions thereof.

As a result of step 28, client object 14 requests information concerning the location of server object 16 from directory services 20 as indicated by step 30. In a local platform configuration, directory services 20 may conveniently be locally maintained. In a multi-platform environment, directory services 20 may conveniently be centrally maintained and/or replicated on each local platform. The development and use of directory services 20 are well known from conventional RPC systems and need not be described herein in any further detail.

Steps 28 and 30 are common to all internal, that is, intra-platform, client-server data paths such as server available data path 26, as well as external or inter-platform data paths as will be discussed below with respect to FIG. 2. When the result of the interrogation of directory services 20 by the messaging facility of the client object determines that the server object is locally resident, as represented by step 32, the intra-platform message and data paths as depicted in FIG. 1 diverge from the inter-platform data paths depicted in FIG. 2. It is important to note, however, that the next step in both intra- and inter-platform data paths uses the RPC facility. In the case of an intra-platform path, such as server available data path 26 depicted in FIG. 1, the RPC facility is used to send the message call to message queue 22 rather than to the server object located on a separate platform.

In particular, as indicated by step 34, when interrogation of directory services 20 by the messaging facility of client object 14 indicates that the called object, server object 16, is co-resident on local platform 15, the RPC facility is used to send the message and the local transport layer on local platform 15 places the message on message queue 22. The message call placed on message queue 22 includes an object handle representing server object 16.

Server available data path 26 being currently described operates when the server object is available. When a server object is available within a conventional external RPC which operates in a manner similar to that of the inter-platform portion of the OPM facility of the present invention as shown in FIG. 2, the server object listens for message calls to it using a conventional asynchronous RPC signal.

In a similar manner as indicated in step 36, server object 16 listens to message queue 22, whenever server object 16 is not unavailable, using a conventional asynchronous RPC signal to determine by means of object handles related thereto in message queue 22 when a message call has been placed in message queue 22 for server object 16. As further indicated by step 36, when server object 16 determines that a message call to server object 16 has been placed in message queue 22, server object 16 causes that message call to be transferred to server object 16. As indicated by step 38, the communications between server object 16 and client object 14 occur through message queue 22. In particular, the acknowledgement of receipt of the message call is sent by server object 16 to client object 14 through message queue 22. If appropriate, data may then be transferred through the queue between the client and server objects.

In this manner it can be seen that when server object 16 is available, intra-platform messaging proceeds between client and server objects, when the server is available, without substantial delay. It is a substantial advantage of the present invention that the intra-platform message transfer may proceed without delay of the operations of the client object, or retransmission of the message, even when the server object happens to be busy when called by the client object.

Server un-available data path 26 between client object 14 and server object 16 on local platform 15 will be described next as an illustration of the message and data flow path between objects on the same platform when the server object is not available to accept and acknowledge the client object message call when made by the client object.

As noted above, steps 28 and 30 of the flow of data between are common to all internal, that is, intra-platform client-server data paths, such as server available data path 26 and the external or inter-platform data paths discussed below with respect to FIG. 2. When the result of the interrogation of directory services 20 by the messaging facility of the client object determines that the server object is locally resident, as represented by step 32, the intra-platform paths are substantially similar for both server available and server unavailable paths except for the relative timing and sequencing of message acknowledgement and data transfer.

In particular, in the case of a server unavailable intra-platform path, such as server unavailable data path 40 depicted in FIG. 1, the RPC facility is used to send the message call to message queue 22 rather than to the server object located on a separate platform.

In particular, as indicated by step 34, when interrogation of directory services 20 by the messaging facility of client object 14 indicates that the called object, server object 16, is co-resident on local platform 15, the RPC facility is used to send the message and the local transport layer on local platform 15 places the message on message queue 22. The message call placed on message queue 22 includes an object handle representing server object 16.

Server unavailable data path 40 is simply the same path as server available data path 26 except that it operates when the server object is not available. Client call path 42 is the client object to message queue portion of server unavailable data path 40. In particular, step 34 operates to place a message call from client object 12 onto message queue 22 via client call path 42. As noted above with respect to step 36, a server object listens for message calls to it using a conventional asynchronous RPC signal. However, if server object 16 is not available when called by client object 12 via client call path 42 because—for example—server object 16 is serving client object 14 via server available data path 26, server object 16 is not then listening for message calls.

It is important to note that, even though server object 16 is busy when called, the use of an internal RPC type facility for intra-platform messaging between objects provides the substantial advantage that the client object does not have to wait until the server object is not busy and additional or follow-on messages are not sent.

In particular, as indicated in step 36, server object 16 listens to message queue 22 when server object 16 becomes available. Server object 16 uses a conventional asynchronous RPC signal via server acknowledgement and listening path 44 to determine by means of object handles related thereto in message queue 22 when a message call has been placed in message queue 22 for server object 16. As further indicated by step 36, when server object 16 determines that a message call to server object 16 has been placed in message queue 22, server object 16 causes that message call to be transferred to server object 16. As indicated by step 38, the communications between server object 16 and client object 14 occur through message queue 22. In particular, the acknowledgement of receipt of the message call is sent by server object 16 to client object 14 through message queue 22. If appropriate, data may then be transferred through the queue between the client and server objects.

In this manner it can be seen that when server object 16 is not available, intra-platform messaging proceeds between client and server objects by means of message queue 22 when the server later becomes available. It should be noted that except for the delay between the placement on message queue 22 of a message call from client object 12 by the local transport layer as indicated by client call path 42 and the listening and acknowledgement by server object 16 over server acknowledgement and listening path 44, server unavailable data path 40 and server available data path 26 operate in the substantially similar manners.

Referring now more specifically to FIG. 2, the operation of the external RPC facility, for example, for multi- and/or inter-platform messaging and data transfer operates in the same general manner. In particular, when the messaging facility of client object 12 determines by interrogation of directory services 20 that the requested server object, such as server object 46, is not on local platform 15 but some other computer or platform, the external RPC portion of the Object Procedure Messaging, or OPM facility, operates in a conventional manner as a standard RPC facility. That is, client object 12 passes a message call to NCK 48 of protocol independent sockets 50 by means of client RPC path 52 which is acknowledged by server object 46, when available, by means of object RPC path 54.

In this way it can be seen that the shielding of client and server objects from the details of inter-object communications conventionally use for objects not on the same platform may be extended for used for intra-platform messaging with substantial benefit and advantage. Although a generalized embodiment using intra-platform or internal messaging in combination with an inter-platform messaging operating in a conventional manner has been shown, it is well within the skill of a person of ordinary skill in this art to utilize the present invention in various specific applications in other particular and specialized manners. The specific embodiments described herein are intended to provide a convenient example illustrating the development, use and operation of the OPM of the present invention and may not be used to limit the scope of the invention which is defined by the claims hereafter appended.

What is claimed is:

1. A method of communicating via a remote procedure calling (RPC) facility between client and server entities on computer platforms interconnected by a transport network, comprising:

determining if a server is located on the same local platform as a client wishing to communicate a message using an RPC call to the server;

transferring the message to the server via the RPC call on the transport network when the client and server are not located on the same local platform;

storing the message with an object identifier in a local memory queue on the local platform when the client and server are located on the local platform and the server is unavailable to respond to the RPC call, so that the RPC call does not have to be re-tried by the client;

causing the server to interrogate the local memory queue when the server is available to respond to the RPC call, wherein the remote procedure calling facility asynchronously accesses the messages in the local memory queue; and transferring the message to the server from the local memory queue.

2. The invention of claim 1, wherein the step of determining if a server is located on the same local platform as a client, further comprises:

searching directory services for the location of a server in response to a request from a client to send a message via a RPC call to the server.

3. The invention of claim 2, wherein the step of searching directory services for the location of a server further comprises:

registering the server with directory services.

4. The invention of claim 1 wherein the step of storing the message in a local memory queue further comprises:

using the remote procedure calling facility to access the local memory queue directly.

5. The invention of claim 1 wherein the step of storing the message in a local memory queue further comprises:

forming a local memory queue on the local platform.

6. The invention of claim 6 wherein the step of storing the message in a local memory queue further comprises:

storing a handle associated with the server in the local memory queue.

7. The invention of claim 1, further comprising:

developing a client stub for communicating with the client and for accomplishing tasks for the client in response to the communications; and developing a server stub for communicating with the server and for accomplishing tasks for the server in response to the communications, wherein the client and server are shielded from communications delays resulting from waiting for a response to a communication.

8. The invention of claim 7, wherein the client stub performs the steps of determining if a server is located on the same local platform, transferring the message to the server via the transport network, and storing the message in a local memory queue.

9. A method of operating a computer network including a plurality of computer platforms interconnected by a network transport system using a remote procedure calling (RPC) facility for communications between objects, comprising:

causing a service requester on a first computer platform to request service from a service provider;

using the RPC facility to obtain the requested service from a selected service provider by issuing an RPC call, further comprising:

determining a location of an eligible service provider for responding to the RPC call;

submitting the RPC call to a network transport system interconnecting the first computer platform to a plurality of additional computer platforms when the location of the eligible service provider is determined not to be on the first platform, operating the network transport system to submit the RPC call to the eligible service provider, operating the eligible service provider to produce a response to the RPC call, submitting the response to the RPC call to the network transport system, and operating the network transport system to return the response to the RPC call to the service requester; and submitting a message associated with the RPC call to a local memory queue on the first computer platform when the location of the eligible service provider is determined to be on the first platform and the eligible service provider is unavailable to respond to the RPC call, so that the RPC call does not have to be re-tried by the service requester, the eligible service provider asynchronously accessing the message stored in the local memory queue to respond to the RPC call when it is available to respond to the RPC call, and the eligible service provider responding to the service requester identified by the accessed message.

10. The invention of claim 9, wherein the step of determining the location of an eligible service provider, further comprises:

searching a directory services facility on the first platform for the location of an eligible service provider.

11. The invention of claim 9, wherein the step of submitting a message further comprises:

storing a handle associated with the RPC call in the message.

12. The invention of claim 4, wherein the step of using the remote procedure calling facility to access the local memory queue directly, further comprises:

using an RPC call to access the local memory queue directly.

13. The invention of claim 1 wherein the step of using the remote procedure calling facility to asynchronously access the local memory queue further comprises:

using an RPC call to asynchronously access the local memory queue.

* * * * *

UNITED STATES PATENT AND TRADEMARK OFFICE
CERTIFICATE OF CORRECTION

PATENT NO. : 6,718,399 B1
DATED : April 6, 2004
INVENTOR(S) : Aubrey Chernick and Sam Greenblatt It is certified that error appears in the above-identified patent and that said Letters Patent is hereby corrected as shown below:

Title page,
Item [56], References Cited, U.S. PATENT DOCUMENTS, insert
-- 4,825,354 *   11/1985     Agrawal et al. ...364/200
   5,146,593 *   3/1989      Brandle et al. ...395/700
   5,218,699 *   8/1989      Brandle et al. ...395/650
   5,218,713 *   6/1985      Hammer et al. ...395/800
   5,428,781 *   10/1989     Duault et al. ...395/650
   5,014,221 *   1/1998      Mogul ...364/519 --
OTHER PUBLICATIONS, insert -- A. Goscinski, Distributed Operating Systems The Logical Design, Addison-Wesley Publishing Comp., pp. 136-146, 186-189.*
W.R. Stevens, Unix Network Programming, Prentice Hall Software Series, pp. 693-708.* --.

Column 7,
Line 46, "6" should read -- 5 --.

Signed and Sealed this

Twenty-fourth Day of August, 2004

JON W. DUDAS
*Director of the United States Patent and Trademark Office*